(12) United States Patent
Schröferl

(10) Patent No.: US 8,807,638 B2
(45) Date of Patent: Aug. 19, 2014

(54) ROOF ARRANGEMENT

(75) Inventor: Thomas Schröferl, Hohenschäftlarn (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/698,258

(22) PCT Filed: Mar. 9, 2012

(86) PCT No.: PCT/EP2012/054136
§ 371 (c)(1),
(2), (4) Date: Jan. 22, 2013

(87) PCT Pub. No.: WO2012/123368
PCT Pub. Date: Sep. 20, 2012

(65) Prior Publication Data
US 2013/0187413 A1    Jul. 25, 2013

(30) Foreign Application Priority Data

Mar. 14, 2011 (DE) .......................... 10 2011 013 818

(51) Int. Cl.
*B60J 10/00* (2006.01)
*B60J 7/00* (2006.01)
*B62D 25/07* (2006.01)
*B62D 29/00* (2006.01)
*B62D 25/06* (2006.01)

(52) U.S. Cl.
CPC ............... *B62D 25/06* (2013.01); *B62D 25/07* (2013.01); *B62D 29/002* (2013.01); *B62D 29/004* (2013.01)

USPC ........................ 296/216.06; 296/215; 296/213

(58) Field of Classification Search
USPC ........ 296/216.06–216.09, 215, 213; 49/496.1
See application file for complete search history.

(56) References Cited

U.S. PATENT DOCUMENTS

| 3,363,364 | A | * | 1/1968 | Cadiou ........................ 49/490.1 |
| 3,964,784 | A | * | 6/1976 | Prechter et al. ............... 296/215 |
| 4,018,476 | A | * | 4/1977 | Lutz et al. ...................... 296/215 |
| 4,220,368 | A | * | 9/1980 | Ferrigan ....................... 296/215 |
| 4,911,497 | A | * | 3/1990 | Schreiter et al. ............. 296/222 |
| 5,069,500 | A | * | 12/1991 | Reihl et al. .................... 296/214 |
| 5,641,196 | A | * | 6/1997 | Homann et al. .............. 296/222 |
| 5,727,839 | A | * | 3/1998 | Ruhringer et al. ............ 296/213 |

(Continued)

FOREIGN PATENT DOCUMENTS

| DE | 19703818 C1 | 4/1998 |
| DE | 102004007988 | 9/2005 |

(Continued)

OTHER PUBLICATIONS

PCT Search Report (PCT/EP2012/054136).

(Continued)

*Primary Examiner* — Dennis H Pedder
(74) *Attorney, Agent, or Firm* — Fitch, Even, Tabin & Flannery, LLP

(57) ABSTRACT

A roof arrangement comprising a cover for closing the opening of a vehicle roof, and fastening plate that is connected to the cover in the edge areas thereof, the cover being height-adjustable relative to the vehicle roof. The roof arrangement can have a sealing lip foamed to the fastening plate for sealing at least some sections of the fastening plate relative to the vehicle roof.

14 Claims, 1 Drawing Sheet

(56) References Cited

U.S. PATENT DOCUMENTS

| | | | |
|---|---|---|---|
| 5,961,177 A * | 10/1999 | Caye et al. | 296/213 |
| 6,073,994 A | 6/2000 | Jardin et al. | |
| 6,270,154 B1 * | 8/2001 | Farber | 296/213 |
| 6,338,526 B1 * | 1/2002 | Jardin et al. | 296/216.06 |
| 6,343,831 B1 * | 2/2002 | Nabert et al. | 296/187.05 |
| 6,375,254 B1 * | 4/2002 | Patz | 296/216.09 |
| 6,491,341 B2 * | 12/2002 | Grimm et al. | 296/216.09 |
| 6,837,538 B2 * | 1/2005 | Itoh et al. | 296/216.06 |
| 6,969,111 B2 * | 11/2005 | Ota | 296/213 |
| 7,032,963 B2 * | 4/2006 | Deppe et al. | 296/217 |
| 8,516,749 B2 * | 8/2013 | Ash et al. | 49/480.1 |
| 2008/0272625 A1 | 11/2008 | Paetz et al. | |

FOREIGN PATENT DOCUMENTS

| | | | |
|---|---|---|---|
| DE | 10158957 B4 | | 10/2005 |
| DE | 102009004479 A1 | | 7/2010 |
| EP | 429361 A1 | * | 5/1991 |
| EP | 1759960 A2 | | 3/2007 |
| JP | S57121925 A | | 7/1982 |
| JP | H03224844 A | | 10/1991 |
| JP | 2000255267 A | | 9/2000 |
| JP | 2008168778 A | | 7/2008 |
| WO | 0194141 A1 | | 12/2001 |

OTHER PUBLICATIONS

English Summary of Japanese Office Action dated Feb. 4, 2014.

* cited by examiner

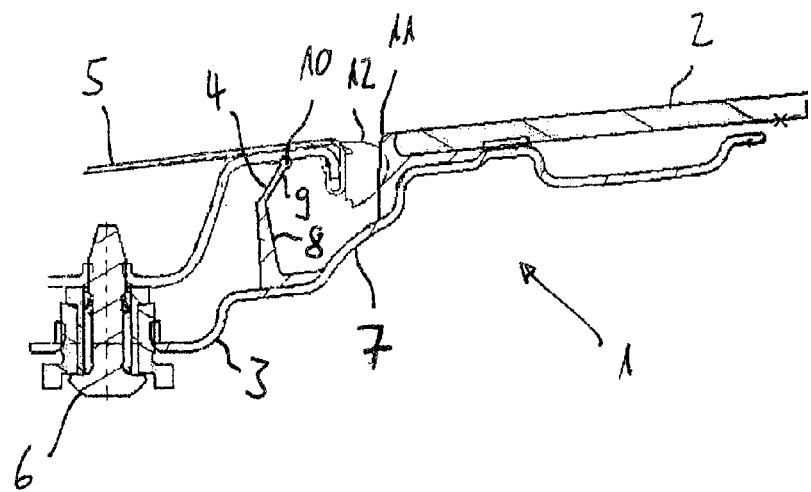
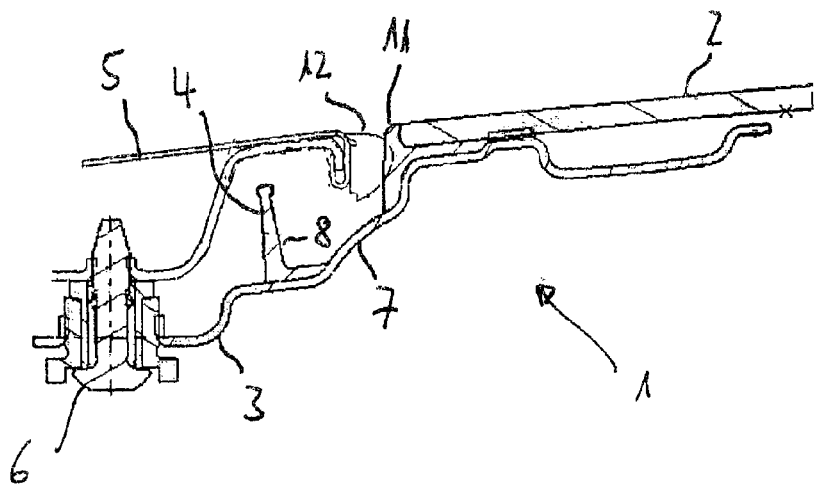
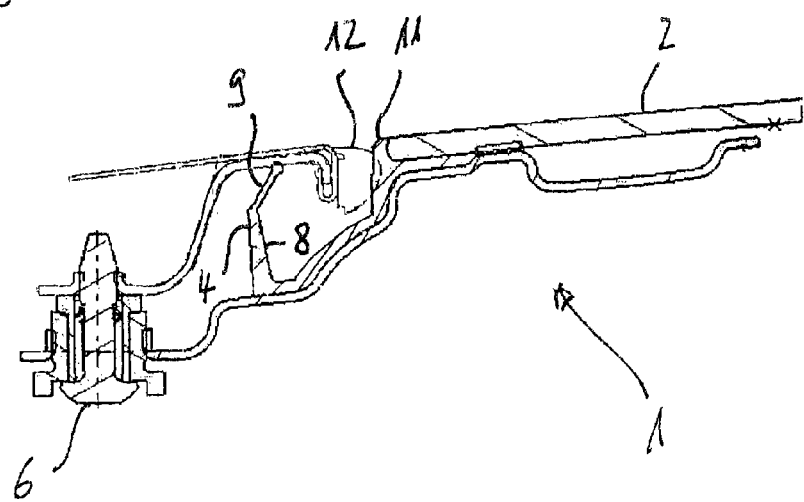

ROOF ARRANGEMENT

CROSS-REFERENCE TO RELATED APPLICATIONS

This application is a U.S. National Stage filing under 35 U.S.C. 371 of International Application No. PCT/EP2012/054136, filed Mar. 9,2012, designating the United States and claims the benefit of foreign priority from German Patent Number 10 2011 013 818.8, filed Mar. 14, 2011, the entire disclosures of which are incorporated herein by reference.

The invention relates to a roof arrangement comprising a cover for closing an opening in a vehicle roof and a fastening plate connected to the cover in the edge area thereof, wherein the cover is height-adjustable relative to the vehicle roof.

Roof arrangements of this kind are frequently implemented using a fixed glass element as the cover. In this case, the opening in the vehicle roof is filled with the fixed glass element. The height of the fixed glass element must be adjusted such that the surface is precisely aligned with the surrounding surface of the vehicle roof. Between the cover and the vehicle roof is a gap which is closed by a seal, but which is never completely sealed by this means. For this reason, a gutter is usually provided in the area beneath the gap between the cover and the vehicle roof, in which penetrating water is collected. An outlet enables the water which has been collected to flow away out of the gutter.

The problem addressed by the invention is that of designing a particularly compact fastening of the cover to the vehicle roof and thereby reliably preventing the ingress of water into the vehicle interior.

This problem is solved according to the invention by a roof arrangement of the kind mentioned above, which is characterized in that a sealing lip is foam-applied to the fastening plate to seal at least some portions of the fastening plate relative to the vehicle roof.

The sealing lip according to the invention may be realized with a very narrow width, so that only a small installation space is required to seal the fastening plate relative to the vehicle roof. In a particularly favorable embodiment of the roof arrangement according to the invention, the sealing lip bears against the vehicle roof in a portion close to an outlet. It is thereby possible for the gutter in this area, in which water can easily accumulate, to exhibit a good seal in respect of the vehicle interior. By contrast, a seal of this kind is not strictly essential in areas lying further away from the outlet. The sealing lip forms a side wall of the gutter in such cases.

A particular advantage of the sealing lip foam-applied to the fastening plate is that there are no non-watertight areas, as in the case of an inserted or adhered seal.

In a particularly advantageous embodiment of the invention, the sealing lip is made of polyurethane, which may be the same material as that used to apply foam around the edge area of the cover. In this way, the entire foam-coating of the cover edge and of the fastening plate and also the sealing lip are produced in a single production step. The terms "spray-coating" and "foam-coating" are used synonymously in the context of the invention described, as they are only differentiated between according to the plastic used. The invention may, however, be used with different plastics, which means that both terms can be used.

In an advantageous development of the invention, the sealing lip exhibits a first area which is foam-applied to the fastening plate and a second adjoining area which is bent relative to the first area and preferably has a smaller thickness than the first area. This means that the sealing lip is particularly well applied to the vehicle roof, thereby facilitating a particularly good seal in this area. Further advantageous embodiments of the invention are indicated in the dependent claims.

The invention is explained below with the help of exemplary embodiments. In the figures:

FIG. 1 shows a cross section through a roof arrangement according to the invention close to an outlet.

FIG. 2 shows a cross section through a roof arrangement according to the invention in an area spaced apart from the outlet and FIG. 3 shows a second exemplary embodiment of a roof arrangement according to the invention.

FIG. 1 shows a roof arrangement according to the invention in cross section, wherein only the transitional area between the cover 2 and the vehicle roof 5 which is relevant to the invention is shown. A fastening plate 3 is secured to a glass cover 2, wherein the connection between the fastening plate 3 and the cover 2 is achieved by a foam-coating 11 of the edge area.

The foam-coating 11 in this case acts like an adhesive, which guarantees a reliable, watertight connection between these two components.

The fastening plate 3 is in turn connected to the vehicle roof 5, wherein the connection is made by means of a device 6 for height adjustment. A screw is provided for this purpose, which is conducted through a recess in the fastening plate 3 and then screwed to a frame of the vehicle roof 5. By operating the screw, the height of the glass cover 2 can be very accurately adjusted relative to the vehicle roof 5. The gap between the glass cover 2 and the vehicle roof 5 is closed by a seal 12. The seal 12 particularly prevents dirt from being able to enter through the gap into the interior. However, the seal is not suitable for sealing the cover 2 in a completely watertight manner in relation to the vehicle roof 5.

In order to collect penetrating water, a gutter is formed beneath the gap between the cover 2 and the vehicle roof 5.

In the exemplary embodiment in FIG. 1, the gutter is formed by an interaction between the fastening plate 3 and a sealing lip 4, which is foam-applied to the fastening plate 3. During foam application or also spray application, an injection molding is mounted on the fastening sheet 3, wherein the injection molding exhibits cavities which are filled later with soft plastic material. Once the plastic material has hardened, the injection molding is removed, in the example in FIG. 1 the sealing lip 4 and also the foam coating 11 are left standing.

As a general rule, only relatively small amounts of water pass through the gap into the gutter from where they have to be removed. However, the water that has penetrated collects close to an outlet, so that this so-called splash water is able to fill the gutter to a comparatively high level. In this area, therefore, which may extend over 200 to 300 mm starting from the outlet, the sealing lip 4 is continued as far as the vehicle roof 5. The gutter therefore forms a closed channel in this area.

In order to achieve particularly good sealing properties, the sealing lip 4 comprises a first area 8 and a second area 9. The first area 8 is foam-applied to the fastening plate 3 and continues in the second area 9. The second area 9 is bent relative to the first area 8, preferably in a range of 10° to 40° relative to a straight-line continuation of the first area. Moreover, the material thickness of the second area 9 is smaller than the material thickness in the first area 8. It is thereby achieved that the same material can be used for the first and second area of the sealing lip 4, although a greater elasticity is required in the second area. At the free end area of the second area 9, a bead-like thickening 10 is provided. This means that the second area 9 may be comparatively thin in configuration, without there being any fraying.

In an area which is more than 200-300 mm away from the outlet in this exemplary embodiment, the sealing lip 4 is configured shorter, as depicted in FIG. 2. The second area 9 of the sealing lip is virtually dispensed with in this area and only the bead-shaped thickening remains, which seals the free end of the sealing lip. This produces a gap between the sealing lip 4 and the vehicle roof, so that in theory the gutter formed by the fastening plate 3 and the sealing lip 4 may overflow and water may get into the interior of the vehicle. However, this is not a problem in practice, since the volumes of water occurring are immediately channeled to the outlet. Moreover, the overlap between the fastening plate 3 and the vehicle roof 5 is comparatively large, so that water cannot drip or spray into the vehicle interior straight from the gap between the cover 2 and the vehicle roof 5 via the sealing lip 4. A development of the vehicle roof 5 in the edge area to the cover 2 also prevents water from being able to overcome the sealing lip 4, which only forms the gutter wall in this area.

The measure whereby the sealing lip 4 is not continued right up to the vehicle roof 5 in the area spaced apart from the outlet has several advantages. A main advantage is that the contact pressure of the fastening plate 3 against the vehicle roof 5 can be comparatively low. The counter-pressure is only produced in the area of the outlet by the second area 9 of the sealing lip 4. In the other areas of the cover edge, no contact pressure is required, however, which means that the device 6 for height adjustment only needs to intercept the weight of the cover and of the fastening plate. For this reason, the device and the fastening plate 3 may be made from a comparatively thin and therefore light and reasonably priced material.

A modified embodiment of a roof arrangement according to the invention is shown in FIG. 3. While in the case of FIGS. 1 and 2 the area between the sealing lip 4 and the edge of the cover 2 was not foam-coated, partial foam-coating is provided in FIG. 3. On the inside of the gutter, the foam-coating in this case is produced continuously from the sealing lip 4 up to the foam-coating 11 of the cover edge.

The invention claimed is:

1. A roof arrangement comprising
a cover for closing an opening in a vehicle roof and a fastening plate connected to the cover in the edge area thereof,
wherein the cover is height-adjustable relative to the vehicle roof,
wherein a sealing lip is foam-applied to the fastening plate to seal at least some portions of the fastening plate relative to the vehicle roof, and
wherein the sealing lip is in contact with the vehicle roof or a frame of the vehicle roof in the area of a water outlet and there is a gap between the sealing lip and the vehicle roof in an area spaced apart from the water outlet.

2. The roof arrangement according to claim 1, wherein the sealing lip is arranged between and in both cases spaced apart from a device for height adjustment of the cover and the edge of the cover.

3. The roof arrangement according to claim 1, wherein the sealing lip is made of a polyurethane material.

4. The roof arrangement according to claim 1, wherein the sealing lip comprises a first area and a second area, wherein the first area is connected to the fastening plate and the second area is bent relative to the first area.

5. The roof arrangement according to claim 4, wherein the bend has an angle of between 10° and 40°.

6. The roof arrangement according to claim 4, wherein the second area exhibits a smaller thickness than the first area.

7. The roof arrangement according to claim 4, wherein the free end area of the second area exhibits a thickening.

8. The roof arrangement according to claim 1, wherein the width of the sealing lip is smaller than 10 mm.

9. The roof arrangement according to claim 1, wherein the height of the sealing lip is smaller than 20 mm, preferably smaller than 15 mm.

10. The roof arrangement according to claim 1, wherein the sealing lip forms a gutter in conjunction with the fastening plate or a spray-coating of the fastening plate.

11. The roof arrangement according to claim 1, wherein the vehicle roof exhibits a bent edge in the edge area to the cover.

12. The roof arrangement according to claim 1, wherein a seal is arranged between the vehicle roof and the cover, said seal closing a gap between the vehicle roof and the cover in the area of the surface of the cover and the vehicle roof.

13. The roof arrangement according to claim 1, wherein the cover is formed by a glass element.

14. A roof arrangement, comprising:
a cover for closing an opening in a vehicle roof and a fastening plate connected to the cover in the edge area thereof,
wherein the cover is height-adjustable relative to the vehicle roof,
wherein a sealing lip is foam-applied to the fastening plate to seal at least some portions of the fastening plate relative to the vehicle roof; and
wherein an area without foam coating of the fastening plate is located between the sealing lip and the edge of the cover.

* * * * *